UNITED STATES PATENT OFFICE.

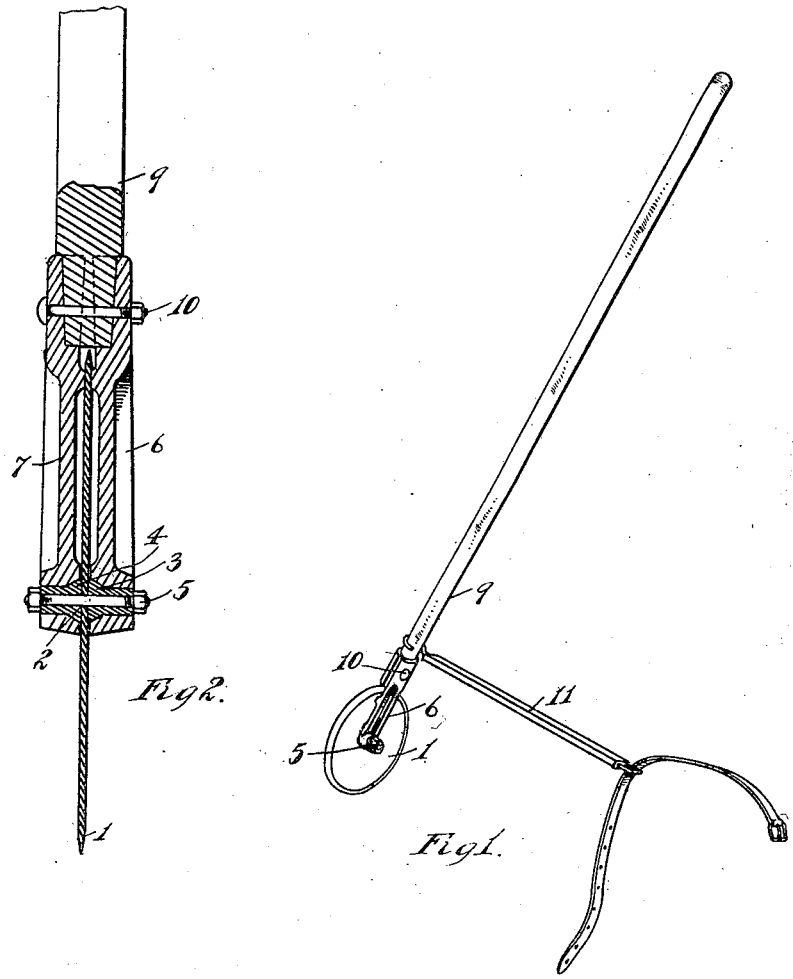

JAMES A. GATES, OF DETROIT, MICHIGAN, ASSIGNOR OF ONE-HALF TO JOHN HINCHMAN, OF DETROIT, MICHIGAN.

EDGE-TRIMMER.

No. 816,459.　　　　Specification of Letters Patent.　　'Patented March 27, 1906.

Application filed June 12, 1903. Serial No. 161,155.

*To all whom it may concern:*

Be it known that I, JAMES A. GATES, a subject of the King of Great Britain, residing at Detroit, county of Wayne, State of Michigan, have invented a certain new and useful Improvement in Edge-Trimmers; and I declare the following to be a full, clear, and exact description of the invention, such as will enable others skilled in the art to which it pertains to make and use the same, reference being had to the accompanying drawings, which form a part of this specification.

This invention relates to edge-trimmers, and has for its object an improved trimmer adapted to be used for cutting through and trimming off the sward at the edge of walks and for similar purposes.

In the drawings, Figure 1 is a perspective showing the invention. Fig. 2 is a vertical cross-section of the cutting part of the tool and its immediate connections.

The cutter is of hardened steel, (indicated at 1.) It is circular in outline and sharpened around its periphery. The disk is provided with a central perforation 2, and on each side of the perforation is a portion of the shaft. The portion 3 of the shaft is provided with a cone-bearing at its inner end next to the cutting-blade, is axially perforated, and is arranged to be held on a bolt 5. The portion 4 is provided with a cone-bearing at its inner end. This also is axially perforated. The two parts are held together and are held to the blade by a bolt 5, on which they are sleeved. The bolt is furnished with a nut at each end. The blade is held by its shaft between the branches of a forked holder, of which there are two branches 6 and 7, provided at their outer ends with cavities that engage over the coned end of the journals and over the cylindrical body parts of the journals and approach closely to the blade. The forks are spread slightly between the journals and that part of each which lies immediately next to the periphery of the cutter. Here each branch of the forked holder approaches closely to the blade, sufficiently close to hold the blade firmly against rocking or twisting on its central bearings. The branches of the forked holder are provided at their ends with cavities which together form a socket for the wooden handle 9, and they are secured together and to the wooden handle by a bolt 10, a single bolt serving to secure them together and to the handle firmly. The firm central bearing of the blade supported by the close-lying forks at the edge enable the rotary trimmer to be utilized as a digging implement to accomplish the character of digging always required when the edges of swards are trimmed.

For some purposes, especially where it is desired to trim around trees and similar places, the handle is grasped by a radius-bar 11, provided with a hook at one end to grasp the handle 9 and with a strap at the other end by which the radius-bar is secured to any standard which may serve as a center.

What I claim is—

1. The combination of a cutter-blade having a central aperture adapted to permit the passage of a bolt, a shaft axially perforated to permit the passage of a bolt, said shaft being formed in two portions, one of said portions increasing in diameter toward its inner end, the inner ends of the portions of the shaft being against the blade, a bolt passing through the perforations in the shaft and aperture in the blade, a nut upon said bolt, said nut and bolt acting only upon said shaft to bind the two parts together and against the blade, a holder having separable forks and having a bearing on one of said forks adapted to fit the surface of variable diameter on said shaft, and a bolt and nut for securing said forks together.

2. The combination of a cutter-blade having a central aperture adapted to permit the passage of a bolt, a shaft axially perforated to permit the passage of a bolt, said shaft being formed in two portions, each of said portions being formed of increasing diameter toward its inner end, the inner ends of said portions of the shaft being against the blade, a bolt passing through the perforations of said axle and aperture in the blade, and acting only against the portions of the shaft to bind the same together and against the blade, and a holder having separable bearings adapted to fit the surfaces of varying diameter on the shaft, and a bolt and nut adapted to secure said bearings together.

In testimony whereof I sign this specification in the presence of two witnesses.

his
　　　　　　JAMES A. ✕ GATES.
　　　　　　　　　　　　　mark

Witnesses:
　CHARLES F. BURTON,
　MAY E. KOTT.